United States Patent [19]
Hoshino

[11] Patent Number: 5,098,159
[45] Date of Patent: Mar. 24, 1992

[54] AUTOMOTIVE SEAT
[75] Inventor: Akihiko Hoshino, Ayase, Japan
[73] Assignee: Ikeda Bussan Co., Ltd., Ayase, Japan
[21] Appl. No.: 550,138
[22] Filed: Jul. 9, 1990
[30] Foreign Application Priority Data
 Jul. 28, 1989 [JP] Japan .................. 1-88034[U]
[51] Int. Cl.$^5$ .................................................. B60N 1/02
[52] U.S. Cl. .................................. 297/379; 297/216
[58] Field of Search ................... 297/379, 216, 452

[56] References Cited
U.S. PATENT DOCUMENTS

| | | | |
|---|---|---|---|
| 3,940,182 | 2/1976 | Tamura | 297/379 X |
| 4,813,741 | 3/1989 | Miyauchi | 297/379 X |
| 4,874,205 | 10/1989 | Arefinejad et al. | 297/379 |

Primary Examiner—Laurie K. Cranmer
Attorney, Agent, or Firm—Brooks & Kushman

[57] ABSTRACT

A seat mounting device for use with a vehicle seat (11) has a recliner mechanism (16) that angularly adjusts the seat back (15) with respect to the seat cushion (13) during use and has a forwardly projecting support member which is pivotally supported by a pivot pin (23) for movement of the seat back between use and easy-enter positions. The vehicle seat (11) also has a mounting device (10) that mounts the recliner support member on a movable rail member of a slide mechanism mounted on a vehicular floor. A leg member (17a) connected to the seating device is generally L-shaped and has a right angle connection between its upper and lower ends. The lower end of the leg member (17a) is fastened to the moveable rail (12a) of the slide mechanism (12). The pivot pin (23) is directly welded to the upper end of the leg member (17a) so that loads applied to the seat back (15) are transmitted to the pivot pin (23) through the base member (22) of the reclining mechanism (16) and thence from the pivot pin (23) to the slide mechanism (12) through the leg member (17a) and finally to the vehicular floor.

7 Claims, 2 Drawing Sheets

AUTOMOTIVE SEAT

TECHNICAL FIELD

The present invention relates to automotive seats, and more particularly to automotive seats of a type which comprises a seat cushion which is connected to a seat slide mechanism connected to a vehicular floor, and a seat back which is connected through a reclining mechanism to the seat cushion in such a manner as to be pivotal forwardly and rearwardly, the reclining mechanism having a base member whose leading end is pivotally connected to a side frame of the seat cushion through a pivot pin and whose rear end has a latch connected thereto, so that, under a normal condition, the latch is kept engaged with an engaging pin formed in the side frame of the seat cushion and when the engagement between the latch and the engaging pin is cancelled, the seat back becomes available to incline forward together with the reclining mechanism.

BACKGROUND OF INVENTION

A conventional automotive seat is shown in FIGS. 3 and 4. The automotive seat 11 comprises a seat cushion 13 which is mounted to a seat slide mechanism 12 secured to a vehicular floor, and a seat back 15 which is connected through a reclining mechanism 16 to a rear end of the seat cushion 13 in a manner to be pivotal forward and rearward.

To a movable rail 12a of the seat slide mechanism 12, there are connected paired front and rear leg members 17, 17a each having a generally L-shape. An upper portion of each leg member 17, 17a is welded or bolted to a side frame 21 which partially constitutes the seat cushion frame.

To the side frame 21, there is pivotally connected a front end of a base or support member 22 of the reclining mechanism 16 through a pivot pin 23 having an end attached to the side frame 21. The base member 22 has a rear end to which a latch 25 is provided. Usually, the latch 25 is kept engaged with an engaging pin 27 formed on the side frame 21. By cancelling the engagement between the latch 25 and the engaging pin 27, the seat back 15 becomes available to pivot forward together with the base member 22 of the reclining mechanism 16. The forward pivoting of the seat back 15 is incorporated with an operation of a walk-in mechanism of the automotive seat 11.

However, when, in the conventional automotive seat 11, an abnormal load is applied to the seat back 15 due to a vehicle collision or the like, the load is applied to the pivot pin 23 of the reclining mechanism 16, and thus, the side frame 21 having the pivot pin 23 at a middle portion thereof is liable to be deformed.

An object of the present invention is to provide an automotive seat which even when, due to a vehicle collision or the like, a load is applied to the seat back, the side frame of the seat cushion is resistant to deformation.

DISCLOSURE OF THE INVENTION

The present invention aims to provide an automotive seat which comprises a seat cushion which is connected to a seat slide mechanism connected to a vehicular floor, and a seat back which is connected through a reclining mechanism to the seat cushion in such a manner as to be pivotal forwardly and rearwardly. The reclining mechanism has a base member whose leading end is pivotally connected to a side frame of the seat cushion through a pivot pin and whose rear end has a latch connected thereto, so that, under a normal condition, the latch is kept engaged with an engaging pin formed on the side frame of the seat cushion and when the engagement between the latch and the engaging pin is cancelled, the seat back is enabled to incline forward together with the reclining mechanism, in accordance with this invention a leg member secures the side frame to a movable rail of the seat slide mechanism and an upper portion of the leg member is welded to the pivot pin which pivotally supports the leading end of the base member.

In operation, upon a vehicle collision or the like, a load is applied to the seat back. The load is transmitted to the pivot pin through the base member of the reclining mechanism and then transmitted from the pivot pin to the seat slide mechanism through the leg member and then to the vehicular floor.

BRIEF DESCRIPTION OF THE DRAWINGS

FIGS. 1 and 2 are drawings showing an automotive seat which is an embodiment of the present invention, in which FIG. 1 is a side elevational view and FIG. 2 is a perspective of an essential portion of the invention.

BEST MODE FOR CARRYING OUT THE INVENTION

In the following, an automotive seat according to the present invention will be described in detail with reference to the attached drawings.

Figure 1:
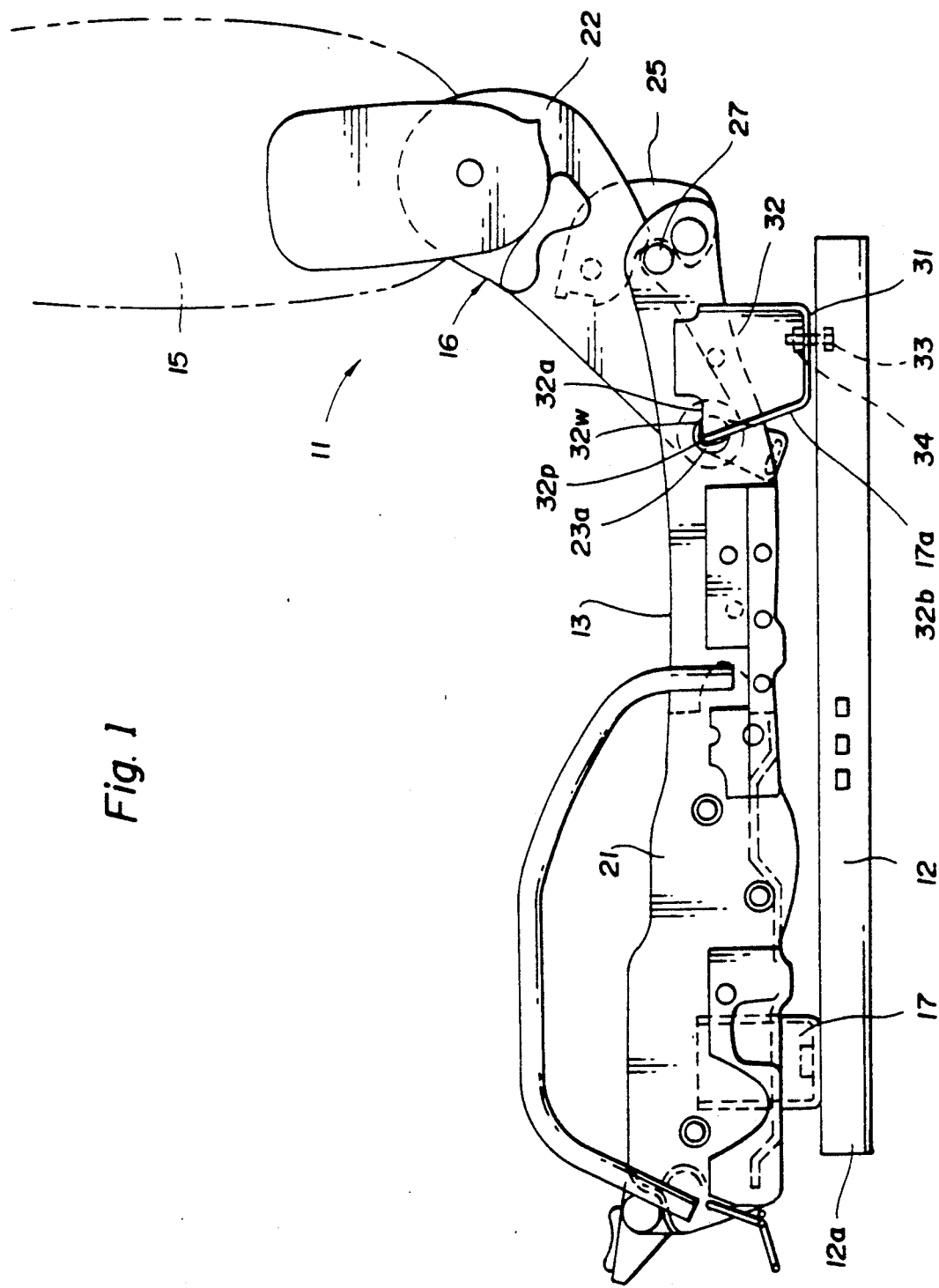
Figure 2:
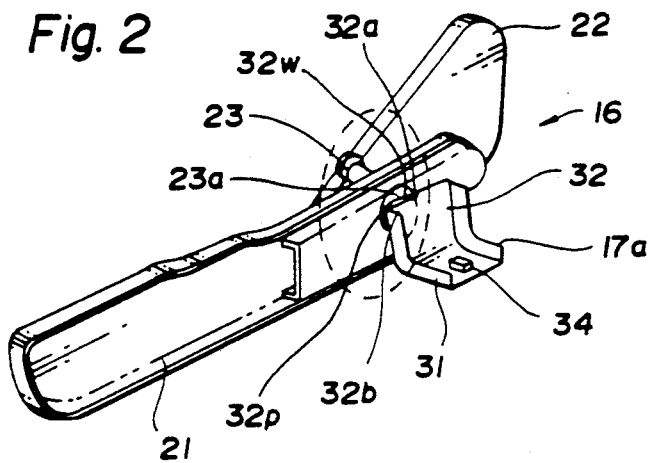
Figure 3:
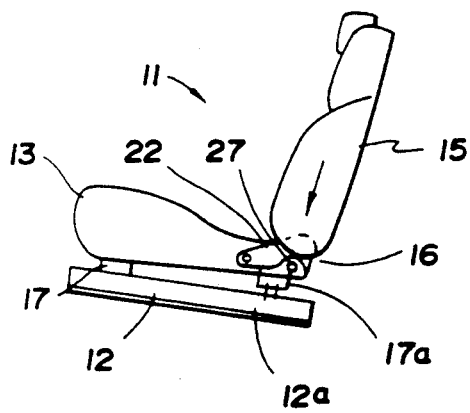
FIGS. 3 and 4 are drawings respectively showing side and partial perspective views of a conventional automotive seat which has been improved by this invention.
Figure 4:
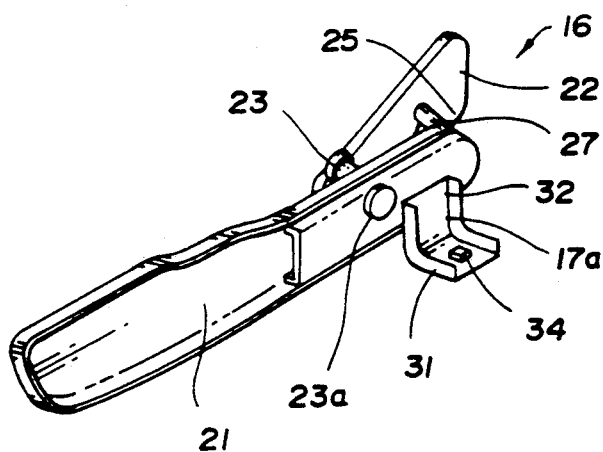

Referring to FIGS. 1 and 2, there is shown an automotive seat which is an embodiment of the present invention. Parts which are substantially the same as those described in the part of the seat of FIGS. 3 and 4 are denoted by the same numerals and detailed description of them will be omitted from the following. The connecting leg members 17, 17a are secured to the movable rail 12a of the seat slide mechanism 12 and are used for achieving a connection with the side frame 21 and the pivot pin 23 by which the front end of the base member 22 is pivotally supported.

Paired leg members 17, 17a used for connecting the side frame 21 are provided to front and rear portions of the movable rail 12a. The leg member 17, 17a that is provided to the rear portion is L-shaped and has a lower portion or attachment end 31 secured to the movable rail 12a through a fastener, such as a bolt 33 and nut 34.

The leg member 17a is provided with an upper portion 32 having a cut portion 32a and a stepped portion 32b that cooperatively define a pointed portion 32p with which a head portion or distal end 23a of the pivot pin 23 is mated.

The pointed portion 32p of the upper end of the cut portion 32a includes a weld 32w having a pointed shape that provides connection of the leg member 17a; to a center of the head portion 23a of the pivot pin 23. The pointed shape of the weld 23w provides additional strength to the weld 23w between the leg member 17a and the pivot pin 23 by increasing the length of the area that is welded.

Various known latching means are usable in the invention, such as a latch mechanism for the seat slide mechanism 12 and a latch mechanism for the reclining mechanism 16 for achieving engagement and disengagement between the latch 25 and the engaging pin 27.

The automotive seat which is an embodiment of the present invention has the above-mentioned construction. According to this construction, the leg member for achieving a connection with the side frame is secured to the movable rail of the seat slide mechanism and the upper portion of the leg member is welded to the pivot pin by which the front end of the base member is pivotally supported. Thus, when, upon a vehicle collision or the like, a load is applied to the seat back, the load is transmitted to the pivot pin through the base member of the reclining mechanism and then transmitted from the pivot pin to the seat slide mechanism through the leg member and finally to the vehicular floor. Accordingly, the device is available to reduce deformation of the portion of the side frame at the pivot pin and thus, obtain an improved automotive seat.

While the best mode for carrying out the invention has been described in detail, those familiar with the art to which this invention relates will recognize various alternative designs and embodiments for practicing the invention as defined by the following claims.

I claim:

1. A seat mounting device for use with a seat back and a seat cushion and also having a recliner mechanism that angularly adjusts the seat back with respect to the seat cushion during use and has a forwardly projecting support member, a mounting device that mounts the recliner support member on a movable rail member of a vehicle floor mountable slide mechanism, the mounting device comprising:

a leg member having a lower and upper ends;

a fastener for securing the lower end of the leg member to the movable rail of the slide mechanism;

a pivot pin having an attachment end and a distal end having an axial surface; and means for directly connecting the axial surface of the distal end of the pivot pin to the upper end of the leg member with the pivot pin extending horizontally such that its distal end can pivotally support the support member of the recliner mechanism for movement of the seat back between use and easy-enter positions.

2. The seat mounting device of claim 1 wherein the leg member is generally L-shaped and has a right angle connection between its lower and upper ends.

3. The seat mounting device of claim 1 or 2 wherein the connecting means comprises a point-shaped weld that secures the axial surface of the distal end of the pivot pin to the upper end of the leg member.

4. The seat mounting device of claim 3 wherein the axial surface of the distal end of the pivot pin directly engages the upper end of the leg member, and the point-shaped weld securing the axial surface of the distal end of the pivot pin to the upper end of the leg member.

5. The seat mounting device of claim 4 wherein the upper end of the leg member includes a pointed portion that directly engages the axial surface of the distal end of the pivot pin and the point-shaped weld secures the axial surface of the pivot pin distal end to the pointed portion of the upper end of the leg member.

6. The seat mounting device of claim 5 wherein the pointed portion of the upper end of the leg member and the pointed shape of the weld each define an acute angle.

7. The seat mounting device of claim 1 wherein the fastener for securing the end of the leg member to the movable rail of the slide mechanism is of conventional means.

* * * * *